UNITED STATES PATENT OFFICE.

ROBERT H. YOUNGMAN, OF PITTSBURGH, PENNSYLVANIA.

REFRACTORY BRICK.

1,231,684.  Specification of Letters Patent.  Patented July 3, 1917.

No Drawing.  Application filed May 25, 1915. Serial No. 30,259.

*To all whom it may concern:*

Be it known that I, ROBERT H. YOUNGMAN, a resident of Pittsburgh, in the county of Allegheny and State of Pennsylvania, have invented a new and useful Improvement in Refractory Bricks, of which the following is a specification.

This invention relates to the manufacture of refractory bricks, or compositions therefor, and particularly to what are known as bauxite bricks suitable for use in boiler side walls, dolomite or magnesite calcining kilns, cement or other kilns, open hearth furnaces or other metallurgical furnaces.

In manufacturing bauxite brick it is difficult to burn the brick satisfactorily so that it will have a strong bond and dense structure which offers proper resistance to slags, liquids and gases. Usually such brick, or any brick containing high percentages of alumina, are very porous or of open texture, even when burned at extremely high temperatures, say over 2500 degrees Fahrenheit. The open pores present a more extensive surface to the penetrating liquids, slags and gases, so that they are eaten or worn away more rapidly, which limits their uses to a narrow range.

The object of this invention is to provide an improved brick or composition, and a method of making the same, which overcomes the objections to prior brick of this kind and secures a dense, non-porous and very refractory brick capable of wide use and having a long life as compared with prior brick.

In the manufacture of my brick I mix suitable bauxite ore with magnesite or its equivalent, either with or without the addition of a small percentage of chromium ore, or chromium oxid. The chromium ore, or chromium oxid, acts as a binding agent in connection with the magnesite and may be in the form of crude chromium ore or oxid. While it may be omitted, it is preferably used, as it is highly refractory and a small percentage increases the density and strength of the structure.

The magnesite may be raw or crude product or in any stage of calcination and, if desired, may also be a dolomite ore or a magnesium ore containing varying percentages of lime, all of which are understood to be equivalents.

The brick may be made in several ways, one of which consists in first calcining the bauxite and mixing the calcined material with the proper quantities of calcined magnesite or its equivalent and crude chromium ore or oxid. The mixture is then ground to a proper fineness for molding and is mixed with only sufficient water to make it hold together, the general rule being that the less moisture used the better. The brick are then molded by hand or in a press, but preferably under high pressure, say 1500 to 12000 pounds per square inch, to produce a very compact dense structure. They are then dried in the usual manner and burned in kilns in a manner similar to the burning of magnesite or other refractory products.

The raw products, to wit, the bauxite, magnesite or its equivalent, and chromium ore or oxid, may be mixed first and then calcined *en masse,* which produces a uniform and homogeneous product and may be preferable, but separate calcination may be more economical.

This composition, burned at a suitable temperature, say about 2800 degrees Fahrenheit, gives an extremely dense structure combined with a very high degree of refractoriness, and produces a much better brick than prior methods or compositions.

One suitable composition producing a very high grade brick contains $7\frac{1}{2}$ per cent. of magnesite and $1\frac{1}{2}$ per cent. of chrome, the remainder being bauxite, but these ingredients may, of course, be used in greater or less proportions, as desired, and may also vary somewhat, depending upon the quality of the bauxite or oxids of alumina that may be used as basic material.

What I claim is:—

As a new article of manufacture, a refractory brick, consisting of calcined bauxite, about seven per cent. of magnesite or its equivalent, and about one and one half per cent. of chromium ore.

In testimony whereof, I have hereunto set my hand.

ROBERT H. YOUNGMAN.

Witnesses:
 MARGARET GRAHAM,
 J. S. A. SMITH.